Sept. 18, 1945. H. S. TEN EYCK ET AL 2,384,856
MANUFACTURE OF CRUDE PHOSPHORIC ACID
Filed July 9, 1942
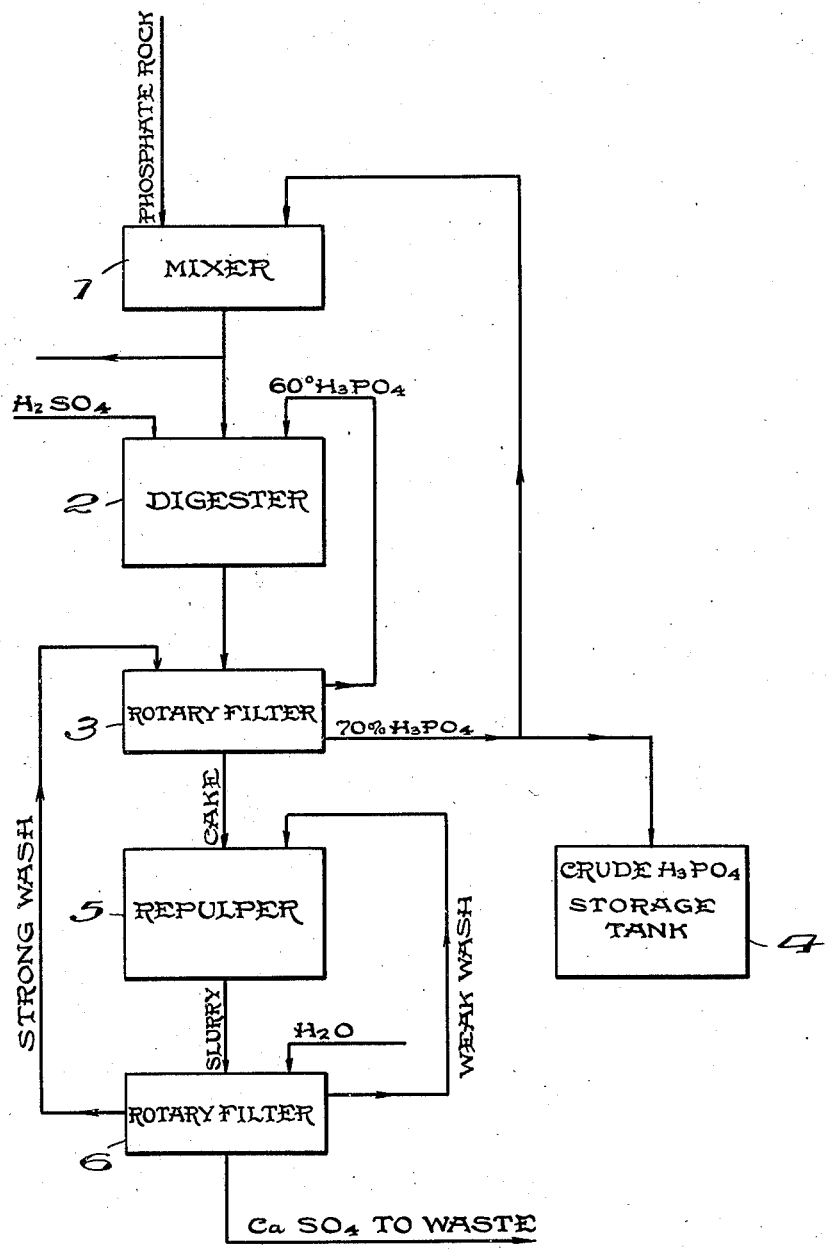
Inventors
HUGH S. TEN EYCK
JOHN H. COLEMAN
JOHN CHOCHOLAK
By Pennie Davis Marvin Edmonds
Attorneys Patented Sept. 18, 1945

2,384,856

UNITED STATES PATENT OFFICE 2,384,856

MANUFACTURE OF CRUDE PHOSPHORIC ACID

Hugh S. Ten Eyck and John Chocholak, North Plainfield, and John H. Coleman, Plainfield, N. J., assignors to Southern Phosphate Corporation, New York, N. Y., a corporation of Delaware Application July 9, 1942, Serial No. 450,310

6 Claims. (Cl. 23—165)

The present invention relates to a process for the production of crude phosphoric acid and is an improvement on the process of producing crude phosphoric acid disclosed in application Serial No. 438,174, filed April 8, 1942, by one of us, in which natural phosphate rock or other phosphatic material is mixed with phosphoric acid in such amounts as to produce a resulting product in which the CaO to $P_2O_5$ ratio is greater than 1:1 but less than 2:1, after which the resulting mixture is calcined to produce a substantially dehydrated phosphate complex or polyphosphate which is digested with a mixture of sulfuric and phosphoric acids to produce a crude phosphoric acid.

We have found that material operating advantages are obtained, both in the production of crude phosphoric acid and phosphoric acid of high purity, if instead of forming a substantially dehydrated phosphate complex or polyphosphate having a CaO to $P_2O_5$ ratio greater than 1:1 but less than 2:1 and then digesting it with a mixture of sulfuric and phosphoric acids to produce the crude phosphoric acid, the natural phosphate rock or other phosphatic material and phosphoric acid are mixed in such relative amounts that the resulting product has a CaO to $P_2O_5$ ratio less than 1:1 but not less than 1:2, and that product, in a somewhat wet or pasty condition, digested with a mixture of sulfuric and phosphoric acids. Not only does such a procedure eliminate the necessity of calcining the mixture to produce a substantially dehydrated phosphate complex, but if the reaction between the phosphatic material and the phosphoric acid is permitted to go to completion and the resulting phosphate complex is only partially dehydrated, the resulting product is digested more readily, in less time, and under less exacting temperature conditions.

Accordingly, the present invention relates to a process in which crude phosphoric acid is obtained by mixing phosphoric acid with natural phosphate rock or other phosphatic material in such relative amounts that a mixture is obtained having a CaO to $P_2O_5$ ratio less than 1:1 but not less than 1:2, permitting the reaction between the phosphate rock and the phosphoric acid to go to completion while the mixture is heated only sufficiently to drive off enough water so that on subsequent digestion with sulfuric and phosphoric acids the amount of water remaining in the concentrated product will be just sufficient to form crude phosphoric acid of the desired strength, and then digesting the reaction product with sulfuric and phosphoric acids to form more phosphoric acid and to precipitate calcium present as calcium sulfate.

When natural phosphate rock is used as a starting material from which the crude phosphoric acid is produced, it is ground to a suitable fineness and then admixed with phosphoric acid in such relative amount that the CaO to $P_2O_5$ ratio in the resulting mixture is less than 1:1 but not less than 1:2. The use of such an amount of phosphoric acid for treating the phosphate rock results in a product which does not set up and hence reacts more completely and is in a better condition for subsequent digestion to produce crude phosphoric acid.

When the phosphate rock and phosphoric acid are mixed in such amounts that the resultant product has a CaO to $P_2O_5$ ratio within the range specified above, the combination of the chemical heat of the reaction and the reaction itself, causes water to be driven off at a low temperature. For example, during mixing of the phosphate rock and phosphoric acid at 80° C., volumes of water are driven off which are far beyond the amount of water that would be driven off from phosphoric acid at that temperature. In other words, it takes less external heat to eliminate the water than when the phosphate rock and phosphoric acid are mixed in other proportions. The amount of heat necessary is substantially less than that required to drive off the water in weak phosphoric acid, or that required to remove water from the polyphosphate formed in the process of the aforesaid application, Serial No. 438,174, where the phosphate rock and phosphoric acid are mixed in amounts such that the resulting product has a CaO to $P_2O_5$ ratio greater than 1:1 but less than 2:1.

The use of phosphoric acid in the treatment of the natural phosphate rock is preferable to the use of sulfuric acid, as it reacts more readily than the sulfuric acid, due to the fact that sulfuric acid initially reacts with the phosphate rock and forms thereon a coating of calcium sulfate which acts as a barrier and impedes further reaction between the sulfuric acid and the phosphate rock. When phosphoric acid is used the calcium phosphate which is formed dissolves in the phosphoric acid and does not remain as an insoluble coating on the phosphate rock to impede further reaction. Furthermore, in the present process it is desirable to prevent the formation of calcium sulfate until all of the phosphate rock has been decomposed.

The concentration of the phosphoric acid with which the phosphate rock is treated is not critical and a portion of the crude phosphoric acid obtained by the process preferably is used. It should contain enough water so that the material leaving the mixer will contain an amount of water sufficient to form crude phosphoric acid of the desired strength upon subsequent digestion with sulfuric and phosphoric acids.

The phosphate rock and phosphoric acid should be thoroughly mixed for a length of time sufficient to permit the reaction to go to completion and when the total amount of water introduced with the phosphate rock or with the phosphoric acid is greater than that necessary subsequently to form crude phosphoric acid of the desired strength, all such excess water should be driven off before the resulting mixture is digested with the sulfuric and phosphoric acids.

The specific temperature at which the mixing of the phosphate rock and the phosphoric acid is carried out is not important so long as the temperature is not permitted to rise high enough to form metaphosphate, as it has been found that the metaphosphate is not readily digested to form phosphoric acid. Ordinarily, where there is an excess of water present, the temperature will be maintained above 100° C. because below that temperature elimination of water proceeds much more slowly. The most practical temperatures, considering the heat input and length of time required to remove excess water present, appear to be between 100° C. and 150° C. The reaction between the phosphate rock and the phosphoric acid is exothermic, and if either the phosphate rock or the phosphoric acid added during the mixing is at a sufficiently high temperature, the heat of the reaction may be sufficient and separate heating may not be necessary.

If the process is operated to produce crude phosphoric acid of 70% concentration and a portion thereof returned for mixing with the phosphate rock, the heating of the mixture of phosphate rock and phosphoric acid normally will be such as to drive off approximately 50% of the volatile matter, including free water, combined water, volatile organic matter and halogens which are present in the phosphate rock as impurities.

If the process is being carried out solely for the production of crude phosphoric acid, all of the product resulting from the mixing of the phosphate rock and phosphoric acid and consisting essentially of a calcium phosphate or a phosphate complex having a CaO to $P_2O_5$ ratio less than 1:1 but not less than 1:2 is digested with a mixture of sulfuric and phosphoric acids to form more crude phosphoric acid. However, if the process is being practiced as a part of a process for producing acid calcium metaphosphate or phosphoric acid of high purity, a portion only of the resulting product is used for digesting with the sulfuric and phosphoric acids, with the balance of the product being calcined to form a relatively dry acid metaphosphate which may be shipped as a concentrated source of $P_2O_5$, or treated further for the production of phosphoric acid of high purity, as described in detail in the aforesaid application filed by one of us.

The portion of the phosphate complex or calcium phosphate which is used for the production of crude phosphoric acid is digested with a mixture of sulfuric and phosphoric acids to form the crude phosphoric acid and to precipitate calcium present as a readily filterable form of calcium sulfate.

A mixture of sulfuric and phosphoric acids is used for the digestion of the phosphate complex or calcium phosphate as sulfuric acid, if used alone, would react with the phosphate with the resultant formation of an insoluble coating of calcium sulfate on the particles thereof which would impede further reaction. When a mixture of sulfuric and phosphoric acids is used, the phosphoric acid first reacts with the phosphate to form a soluble calcium phosphate which dissolves in the phosphoric acid present and then reacts with the sulfuric acid to form the insoluble calcium sulfate. Furthermore, the washing of the filtered calcium sulfate to recover entrained phosphoric acid gives a solution of phosphoric acid which may be used in a subsequent operation for reaction with the phosphate complex or calcium phosphate.

The phosphate complex or calcium phosphate and the mixture of sulfuric and phosphoric acids are permitted to digest until all the calcium present has reacted with the sulfuric acid, which will take place in from one to two hours or longer.

The amount of sulfuric acid in the digestion mixture of acids should be sufficient to precipitate all calcium present as calcium sulfate and the amount of phosphoric acid should be sufficient to maintain a fluid mixture of the desired strength, which ordinarily will be approximately one and one-half times the amount of $P_2O_5$ in the phosphate.

The strength of the sulfuric and phosphoric acids used for digesting the phosphate will depend on the extent to which the calcination or dehydration of the mixture of phosphate rock and phosphoric acid was carried out and the desired concentration of the crude orthophosphoric acid which is to be obtained. Acids of a concentration sufficient to result in a recovery of phosphoric acid consistently running 70% or over in concentration preferably are used. When acids of such concentration are used, calcium sulfate in a readily filterable form is precipitated.

After the calcium phosphate or the phosphate complex has been digested with the sulfuric and phosphoric acids for a length of time sufficient to precipitate all of the calcium present as calcium sulfate, the resulting mixture is filtered to separate the calcium sulfate and to recover the crude phosphoric acid. A portion of the recovered acid preferably is returned for mixing with more phosphate rock to form the phosphate complex having a CaO to $P_2O_5$ ratio less than 1:1 but not less than 1:2. The remaining portion of the crude phosphoric acid may be used as such or may be further treated for the production of pure phosphoric acid as described in the aforesaid application.

To further exemplify the invention, reference is made to the accompanying flow sheet which diagrammatically represents one way in which the process may be carried out.

88.2 parts of pebble phosphate rock from the Florida pebble phosphate field, containing 46% CaO and 33.5% $P_2O_5$, ground to a fineness such that 95% passed a 100 mesh screen, was introduced into a mixer 1 with 314 parts of 70% crude phosphoric acid obtained as a product of the process. The phosphate rock and phosphoric acid were introduced cold and strongly agitated. Due to the exothermic nature of the reaction the temperature of the mass rose to approximately 90° C. without the application of external heat. At that point the temperature became more or less stabilized and external heating was then applied to raise the temperature approximately to 100° C. to 105° C. During such heating, water was driven off violently. The temperature was then slowly increased to 125° C., which was the average top temperature. After a short period at 125° C. the reaction between the phosphate rock and the phosphoric acid had gone to substantial completion and the resulting product became too stiff to mix. Analyses showed that a calcium phosphate of the formula $Ca_6P_{22}O_{61}$, having a CaO to $P_2O_5$ ratio of 1:1.83 had been produced. During the heating 92 parts of water were driven off. The amount of water driven off mounted to 97.7% of the free water and 59.5% of the total water present, considering the total water present to be the free water added with the acid, moisture present in the phosphate rock, and the combined water present in the phosphoric acid to that amount represented by the hydrogen present.

The phosphate concentrate from the mixer 1 was passed to the digester 2 where it was digested with 60% phosphoric acid containing approximately one and one-half times as much $P_2O_5$ as that present in the phosphate concentrate. Enough of the 60% phosphoric acid was used to give approximately 280 parts of $P_2O_5$. After the digestion with the phosphoric acid had begun, 77.2 parts of 92% sulfuric acid was added to precipitate the calcium present as calcium sulfate and digestion continued for two hours at a temperature ranging from 55° C. to 75° C.

The mixture from the digester 2 was passed to a rotary filter 3 where the precipitated calcium sulfate was readily separated. The first filtrate consisted of 500 parts of 70% crude phosphoric acid. A portion of the 70% crude acid was returned to the mixer 1 for mixing with further amounts of finely divided phosphate rock while the remainder was passed to a crude acid storage tank 4. The resulting filter cake was washed with the strong wash water from a subsequent filtering step to recover entrained acid and produced 210 parts of $P_2O_5$ in the form of 60° phosphoric acid which was returned to the digester 2 for use in digesting the partially dehydrated phosphate from the mixer 1. The filter cake from the filter 3 was passed to a repulper 5 where it was formed into a slurry which was passed to a second rotary filter 6. The strong wash water from the filter 6 was returned to the filter 3 while the weak wash water was returned and used in forming the slurry in the repulper 5. The calcium sulfate cake from the filter 6 was passed to waste.

While a specific example of forming the crude phosphoric acid has been described, it is to be understood that such further disclosure is merely by way of exemplification and that the invention is not limited thereby and that various changes may be made in the procedure within the scope of the appended claims without departing from the invention or sacrificing any of the advantages thereof.

Reference also is made to the application of J. H. Coleman filed August 15, 1941, Serial No. 407,051, in which there is claimed a process in which a substantially anhydrous acid calcium metaphosphate having CaO and $P_2O_5$ in a ratio less than 1:1 but not less than 1:2 is digested with phosphoric acid to convert it to a calcium metaphosphate having a CaO to $P_2O_5$ ratio of 1:1 and to form metaphosphoric acid, after which the resulting calcium metaphosphate in solution in phosphoric acid is brought into intimate contact with sulfuric acid to form phosphoric acid and to precipitate from the solution calcium present as calcium sulfate.

What is claimed is:

1. The method of producing phosphoric acid which comprises mixing a calcium phosphate with a phosphoric acid of high concentration in an amount such that the resulting mixture has a CaO to $P_2O_5$ ratio less than 1:1 but not less than 1:2, permitting the reaction between the calcium phosphate and phosphoric acid to go substantially to completion, and intimately mixing the product of the reaction, while it still is wet and contains a substantial portion of the water originally present, with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the reaction between the calcium phosphate and the phosphoric acid in solid form with resultant formation of a coating of insoluble precipitate of calcium sulfate on the particles thereof, which would impede further reaction of the sulfuric acid with the particles.

2. The method of producing phosphoric acid which comprises mixing a calcium phosphate with a phosphoric acid of high concentration in an amount such that the resulting mixture has a CaO to $P_2O_5$ ratio less than 1:1 but not less than 1:2, permitting the reaction between the calcium phosphate and phosphoric acid to go substantially to completion while the mixture is maintained at a temperature below that at which calcium metaphosphate will form, but sufficiently high to eliminate a portion of the water present, and intimately mixing the product of the reaction, while it still is wet and contains a substantial portion of the water originally present, with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the reaction between the calcium phosphate and the phosphoric acid in solid form with resultant formation of a coating of insoluble precipitate of calcium sulfate on the particles thereof, which would impede further reaction of the sulfuric acid with the particles.

3. The method of producing phosphoric acid which comprises mixing a calcium phosphate with a phosphoric acid of high concentration in an amount such that the resulting mixture has a CaO to $P_2O_5$ ratio of less than 1:1 but not less than 1:2, permitting the reaction between the calcium phosphate and phosphoric acid to go substantially to completion while the mixture is maintained at a temperature above about 100° C. and below that temperature at which calcium metaphosphate will form so that a portion of the water present will be eliminated, and intimately mixing the product of the reaction, while it still is wet and contains a substantial portion of the water originally present, with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the reaction between the calcium phosphate and the phosphoric acid in solid form with resultant formation of a coating of insoluble precipitate of calcium sulfate on the particles thereof, which would impede further reaction of the sulfuric acid with the particles, the amount of water eliminated during the reaction between the calcium phosphate and the phosphoric acid being such that during said subsequent reaction with sulfuric acid a concentrated phosphoric acid is obtained.

4. The method of producing phosphoric acid which comprises mixing a calcium phosphate with a phosphoric acid of high concentration in an amount such that the resulting mixture has a CaO to $P_2O_5$ ratio less than 1:1 but not less than 1:2, permitting the reaction between the calcium phosphate and the phosphoric acid to go substantially to completion while the mixture is maintained at a temperature between about 100° C., and 150° C., and intimately mixing the product of the reaction, while it still is wet and contains a substantial portion of the water originally present, with phosphoric acid to form calcium phosphate in solution in phosphoric acid, and reacting the calcium phosphate in solution in phosphoric acid with sulfuric acid to form phosphoric acid and to precipiate from the solution calcium present as calcium sulfate, whereby the sulfuric acid does not react with the product of the reaction between the calcium phosphate and the phosphoric acid in solid form with resultant formation of a coating of insoluble precipitate of calcium sulfate on the particles thereof, which would impede further reaction of the sulfuric acid with the particles.

5. The method of producing phosphoric acid which comprises mixing a calcium phosphate with a phosphoric acid of high concentration in an amount such that the resulting mixture has a CaO to $P_2O_5$ ratio less than 1:1 but not less than 1:2, permitting the reaction between the calcium phosphate and the phosphoric acid to go substantially to completion while the mixture is maintained at a temperature below 315° C. but sufficiently high to eliminate a portion of the water present, and intimately mixing the product of the reaction, while it still is wet and contains a substantial portion of the water originally present, with phosphoric acid to form calcium phosphate in solution in phosphoric acid, reacting the calcium phosphate in solution in phosphoric acid with sulfuric acid to form phosphoric acid and to precipitate from the solution calcium present as calcium sulfate, whereby the sulfuric acid does not react with the product of the reaction between the calcium phosphate and the phosphoric acid in solid form with resultant formation of a coating of insoluble precipitate of calcium sulfate on the particles thereof, which would impede further reaction of the sulfuric acid with the particles, recovering the phosphoric acid thus formed, and returning a portion of the recovered phosphoric acid for reaction with further amounts of calcium phosphate.

6. The method of producing phosphoric acid which comprises mixing a calcium phosphate with a phosphoric acid of high concentration in an amount such that the resulting mixture has a CaO to $P_2O_5$ ratio less than 1:1 but not less than 1:2, permitting the reaction between the calcium phosphate and phosphoric acid to go substantially to completion while the mixture is maintained at a temperature below that at which calcium metaphosphate will form but sufficiently high to eliminate a portion of the water present, intimately mixing the product of the reaction, while it still is wet and contains a substantial portion of the water originally present, with phosphoric acid to form calcium phosphate in solution in phosphoric acid, reacting the calcium phosphate in solution in phosphoric acid with sulfuric acid to form phosphoric acid and to precipitate from the solution calcium present as calcium sulfate, whereby the sulfuric acid does not react with the product of the reaction between the calcium phosphate and the phosphoric acid in solid form with resultant formation of a coating of insoluble precipitate of calcium sulfate on the particles thereof, which would impede further reaction of the sulfuric acid with the particles, the amount of water eliminated during the reaction between the calcium phosphate and phosphoric acid being such that upon said subsequent reaction with sulfuric acid, phosphoric acid having a concentration of the order of 70% is obtained, filtering the product of the reaction with sulfuric acid to remove calcium sulfate from the phosphoric acid, washing the filtered calcium sulfate with water to remove entrained phosphoric acid and to produce a dilute phosphoric acid, and returning said dilute phosphoric acid for dissolving said product of the reaction between the calcium phosphate and phosphoric acid.

HUGH S. TEN EYCK.
JOHN CHOCHOLAK.
JOHN H. COLEMAN.